United States Patent Office 3,318,895
Patented May 9, 1967

3,318,895
PRODUCTION OF 12-SUBSTITUTED-6,7,8,9,10,11-HEXAHYDROCYCLOOCTA[b]QUINOLINES
Edward Joseph Pribyl, Metuchen, and Chester Frank Turk, Elizabeth, N.J., assignors, by mesne assignments, to E. R. Squibb & Sons, Inc., New York, N.Y., a corporation of Delaware
No Drawing. Filed Dec. 5, 1963, Ser. No. 328,169
6 Claims. (Cl. 260—286)

This application is a continuation-in-part of application Serial No. 223,814, filed Sept. 14, 1962, now abandoned.

This invention relates to 12-substituted-6,7,8,9,10,11-hexahydrocycloocta[b]quinolines. More particularly, the invention relates to compounds of the formula (I) 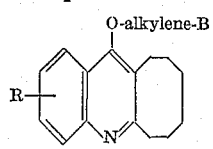

and to acid addition salts thereof.

B is either

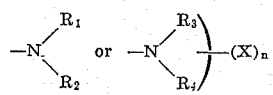

R in Formula I represents hydrogen, lower alkyl, lower alkoxy and halogen. When R is other than hydrogen, the substituent is preferably in the 2-position. The halogens, especially chlorine, are preferred.

$R_1$ and $R_2$, which may be the same or different, each represents hydrogen, lower alkyl, hydroxy-lower alkyl or phenyl-lower alkyl. In addition, the nitrogen may join with the groups represented by $R_3$ and $R_4$ to form a 5 to 7 membered monocyclic heterocyclic containing, if desired, an oxygen, sulfur or an additional nitrogen atom. That is, the two symbols $R_3$ and $R_4$ together represent a tetramethylene, pentamethylene, hexamethylene, oxatetramethylene, oxapentamethylene, azatetramethylene, azapentamethylene, azahexamethylene, thiatetramethylene or thiapentamethylene group. The heterocyclic group may also be substituted by one or two lower alkyl, halogen, lower alkoxy, hydroxy-lower alkyl or lower alkanoyloxy-lower alkyl substitutents, X representing these substituents and hydrogen, and $n$ representing 1 or 2.

Representative substituents symbolized by R include the following: the halogens chlorine, bromine, iodine and fluorine, of which chlorine and bromine are preferred, lower alkoxygroups such as methoxy, ethoxy, propoxy, isopropoxy, butoxy and the like. The alkyl groups included by the symbols R, $R_1$ and $R_2$ are straight or branched chain saturated aliphatic groups containing up to about 12 carbons. Lower alkyl groups such as methyl, ethyl, propyl, isopropyl, butyl, t-butyl, amyl and the like, are, however, preferred. The alkylene chains in the basic substituents are straight or branched saturated aliphatic groups of the same character of which lower alkylene is also preferred.

The basic, nitrogen containing radical (II) 

includes, for example, lower alkylamino, e.g., methylamino, ethylamino, di(lower alkyl)amino, e.g. dimethylamino, diethylamino, dipropylamino, (hydroxy-lower alkyl)amino, e.g., hydroxyethylamino, di(hydroxy-lower alkyl)amino, e.g., di(hydroxyethyl)amino, phenyl(lower alkyl)amino, e.g., benzylamino, phenethylamino, N-(lower alkyl)phenyl(lower alkyl)amino, e.g., N-methylbenzylamino, and the like. Di-lower alkylamino groups are preferred.

Heterocyclic groups represented by the radical

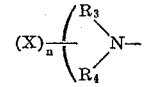

include for example, piperidino, (lower alkyl)piperidino, e.g., methylpiperidino, di(lower alkyl)piperidino, e.g., dimethylpiperidino, (lower alkoxy)piperidino, e.g., methoxypiperidino, 2-, 3- or 4-piperidyl, 2-, 3- or 4-(N-lower alkylpiperidyl), e.g., 2-, 3- or 4-(N-methylpiperidyl), pyrrolidino, (lower alkyl) pyrrolidino, e.g., methylpyrrolidino, di(lower alkyl)pyrrolidino, e.g., dimethylpyrrolidino, (lower alkoxy)pyrrolidino, e.g., ethoxypyrrolidino, 2- or 3-pyrrolidyl, 2- or 3-(N-lower alkylpyrrolidyl), e.g., 2- or 3-(N-methylpyrrolidyl), morpholino, (lower alkyl) morpholino, e.g., 2-methylmorpholino or 3-methylmorpholino di(lower alkyl)morpholino, e.g., 2,3-dimethylmorpholino, (lower alkoxy)morpholino, e.g., ethoxymorpholino, thiamorpholino, (lower alkyl)thiamorpholino, e.g., 2-methylthiamorpholino or 3-methylthiamorpholino, di(lower alkyl)thiamorpholino, e.g., 2,3-dimethylthiamorpholino, (lower alkoxy)thiamorpholino, e.g., 2-methoxythiamorpholino, piperazino, (lower alkyl)piperazino, e.g., $N^1$-methylpiperazino, 2-methylpiperazino or $N^1$-ethylpiperazino, di(lower alkyl)piperazino, e.g., 2,3-dimethylpiperazino, hydroxy-lower alkylpiperazino, e.g., hydroxyethylpiperazino, lower alkanoyloxy-lower alkylpiperazino, e.g., acetoxyethylpiperazino, hexamethyleneimino and homopiperazino. Nitrogen heterocyclics are preferred.

The bases of Formula I form acid addition salts with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, maleate, citrate, succinate, benzoate, ascorbate, salicylate, theophyllinate, camphorsulfonate, alkanesulfonate, e.g., methanesulfonate, benzenesulfonate, toluenesulfonate and the like are also within the scope of the invention. Formation of the acid addition salt frequently provides a convenient means for readily isolating and obtaining pure product. If the free base is then desired, the salt may be neutralized, e.g., with sodium hydroxide.

The compounds of Formula I are obtained from an R-substituted 6,7,8,9,10,11-hexahydrocycloocta[b]quinoline-12[5H]-one of the formula (III) 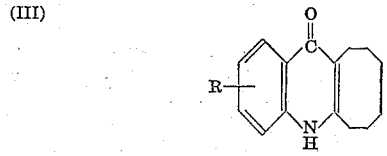

wherein R is the same as previously defined.

This starting material is derived from cyclooctanone and an anthranilic acid of the formula (IV) 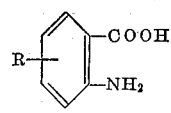

wherein R is the same as previously defined.

The two reactants are preferably heated together with removal of water formed in the reaction, e.g., by distillation.

The keto compound III, preferably in the form of its salt, e.g., an alkali metal salt such as the sodium salt, is reacted with an amino compound having an active halogen, e.g., 3-dimethylaminopropylchloride, morpholinoethyl chloride, etc. to introduce the aminoalkoxy side chain.

By utilizing the procedure of Example 1, but substituting the compound listed in the second column of Table I for the 3-dimethylaminopropyl chloride, the 6,7,8,9,10,11-hexahydrocycloocta[b]quinoline with the side chain in position 12 listed in the third column of Table I is obtained:

TABLE I

| Example | Reactant | Product |
|---|---|---|
| 2 | 2-ethylaminoethyl chloride | 12-(2-ethylaminoethoxy). |
| 3 | 8-dimethylaminooctyl chloride | 12-(8-dimethylaminooctyloxy). |
| 4 | 2-hexamethyleneiminoethyl chloride | 12-(2-hexamethyleneiminoethoxy). |
| 5 | 3-[(2-hydroxyethyl)amino]propyl chloride | 12-{3-[(2-hydroxyethyl)amino]propoxy}. |
| 6 | 3-benzylaminopropyl chloride | 12-(3-benzylaminopropoxy). |
| 7 | 2-piperidylethyl chloride | 12-(2-piperidylethoxy). |
| 8 | 3-(2-methylmorpholino)propyl chloride | 12-[3-(2-methylmorpholino)propoxy]. |
| 9 | 3-piperazinopropyl chloride | 12-(3-piperazinopropoxy). |

Alternatively the 12-keto group is converted to a halogen, e.g., by reaction with a phosphorus oxyhalide such as phosphorus oxychloride, the 12-halo compound is reacted with an alkylaminoalkanol such as dimethylaminopropanol, preferably in the form of the alkali metal salt.

The compounds of this invention have a lowering effect on blood pressure and are useful in the treatment of hypertension. They may be administered orally in the form of tablets, capsules, elixirs, or parenterally in the form of injectables by incorporating the appropriate dosage of a compound of Formula I or a physiologically acceptable acid addition salt thereof in a conventional vehicle according to accepted pharmaceutical practice.

The following examples are illustrative of the invention.

EXAMPLE 1

*12 - (3 - dimethylaminopropoxy) - 6,7,8,9,10,11 - hexahydrocycloocta[b]quinoline, salt with two moles of oxalic acid*

(a) *6,7,8,9,10,11 - hexahydrocycloocta[b]quinoline-12 (5H)one.*—A mixture of 15 g. of anthranilic acid and 18 g. of cyclooctanone is heated at 190° for one hour, then at 210° for 15 minutes, during which time the water formed in the reaction is allowed to distill off. The cooled residue is extracted with 200 ml. hot benzene, filtered and upon cooling there is collected 13.5 g. (54%) of material melting between 332–334° C.

(b) *12 - (3 - dimethylaminopropoxy) - 6,7,8,9,10,11-hexahydrocycloocta[b]quinoline, dioxalate.*—A suspension of 5.7 g. of 6,7,8,9,10,11-hexahydrocycloocta[b]quinoline-12(5H)one in 100 ml. of dry dimethylformamide is added with stirring to a suspension of 1.2 g. of 50% sodium hydride (oil dispersion) in 100 ml. of di-dimethylformamide. The mixture is stirred at room temperature for 15 minutes and then warmed on the steambath for one-half hour when complete solution occurs. The solution is cooled to room temperature and treated with 16 ml. of 1.9 N toluene solution of 3-dimethylaminopropyl chloride. The mixture is stirred and heated on the steam-bath for 5 hours. The sodium chloride is filtered off and the bulk of the dimethylformamide is distilled off on the steam bath in vacuo. The cooled residue is taken up in 200 ml. of ether and extracted with dilute hydrochloric acid. The aqueous is made alkaline with 20% sodium hydroxide and is extracted with ether and dried. The ether is removed and the residue (6 g.) is dissolved in 15 ml. of absolute ethanol and added to a solution of 4.5 g. of oxalic acid in 20 ml. of ethanol. The oxalate which precipitates is collected and recrystallized from 100 ml. of absolute ethanol to give 5.2 g. (42%) of material melting between 141–143° C.

EXAMPLE 10

*2 - chloro - 12 - (3 - dimethylaminopropoxy) - 6,7,8,9,10, 11-hexahydrocycloocta[b]quinoline, salt with two moles of oxalic acid, hydrate*

(a) *2- (p - chloroanilino) - 1 - cyclooctene - 1 - carboxylic acid, ethyl ester.*—Fifty grams of ethyl cyclooctanone-2-carboxylate and 32 g. of p-chloroaniline are mixed and two drops of concentrated hydrochloric acid are added. The contents are kept at 35° C. and 70 mm. for 5 days. The crystalline material is collected and recrystallized from 120 ml. of boiling hexane to give 36 g. (46%) of material melting between 84–86° C.

(b) *2 - chloro - 6,7,8,9,10,11 - hexahydrocycloocta[b] quinoline-12(5H)-one.*—Seventeen grams of 2-(p-chloroanilino)-1-cyclooctene-1-carboxylic acid ethyl ester is added portionwise to 100 ml. of vigorously stirred, boiling (260° C.) "Dowtherm A." After the addition the mixture is stirred and refluxed for one hour and allowed to cool. The product is filtered off, washed with hexane and dried to give 13.5 g. (93%) of material, M.P. 320° C.

(c) *2,12 - dichloro- 6,7,8,9,10,11 - hexahydrocyclo-octo[b]quinoline.*—Twelve grams of 2 - chloro - 6,7,8,9, 10,11-hexahydrocyclooctal[b]quinoline-12(5H)one and 22 ml. of phosphorus oxychloride are refluxed for 15 minutes. The reaction mixture is cooled, poured onto ice and the mixture is made ammoniacal. The product is collected, dried and recrystallized to give 12.0 g. (94%) of material melting between 146–148° C.

(d) *2 - chloro - 12 - (3 - dimethylaminopropoxy)-6,7,8, 9,10,11 - hexahydrocycloocta[b]quinoline, dioxalate, hydrate.*—Six and three-tenths grams of 2,12-dichloro-6,7,8, 9,10,11-hexahydrocycloocta[b]quinoline are added to a solution of 0.8 g. of sodium in 100 ml. of 3-dimethylamino-1-propanol. A trace of sodium iodide is added and the mixture is heated for 6 hours at 120° C. The sodium chloride is filtered off and the excess dimethylaminopropanol is distilled off on the steam bath at 5 mm. The cooled residue is taken up in water and extracted with ether. The ether layer is dried and upon removing the ether there is obtained 7.1 g. of base. It is dissolved in 15 ml. of absolute ethanol and added to a solution of 4.5 g. of oxalic acid in 20 ml. of ethanol. The oxalate which separates on standing is collected and recrystallized from ethanol to give 5.6 g. (46%) of material melting between 165–167° C.

By utilizing the procedure of Example 10, but substituting the 12-chloro-6,7,8,9,10,11-hexahydrocycloocta[b]quinoline having the ring substituent listed in the second column of Table II for the 2,12-dichloro-6,7,8,9,10,11-hexahydrocycloocta[b]quinoline, and substituting the compound listed in the third column of Table II for the 3-dimethylamino-1-propanol, the 6,7,8,9,10,11-hexahydrocycloocta[b]quinoline with the 2- and 12-substituents listed in the last column of Table II is obtained:

and physiologically acceptable acid addition salts of said bases.

TABLE II

| Example | Ring substituent | Reactant | Product |
|---|---|---|---|
| 11 | 2-methyl | 2-diethylamino-1-ethanol | 2-methyl-12-(2-diethylaminoethoxy). |
| 12 | 3-methyl | 2-methylpyrrolidino-1-ethanol | 3-methyl-12-[2-(2'-methylpyrrolidino)ethoxy]. |
| 13 | 2-ethoxy | 3-(N-morpholino)-1-propanol | 2-ethoxy-12-[3-(N-morpholino)propoxy]. |
| 14 | 2-bromo | 3-dimethylamino-1-propanol | 2-bromo-12-(3-dimethylaminopropoxy). |
| 15 | 3-chloro | 2-[4-(2-hydroxyethyl)piperazino]-1-ethanol | 3-chloro-12-{2-[4-(2-hydroxyethyl)piperazino]ethoxy}. |
| 16 | 4-chloro | 3-dimethylamino-1-propanol | 4-chloro-12-(3-dimethylaminopropoxy). |

What is claimed is:

1. A compound selected from the group consisting of bases of the formula

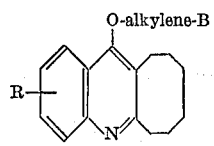

wherein R is a member of the group consisting of hydrogen, lower alkyl, lower alkoxy and halogen, B is a member of the group consisting of

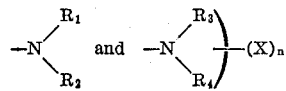

$R_1$ and $R_2$ each is a member of the group consisting of hydrogen, lower alkyl, hydroxy-lower alkyl and phenyl-lower alkyl, $R_3$ and $R_4$ together are a member of the group consisting of tetramethylene, pentamethylene, hexamethylene, oxatetramethylene, oxapentamethylene, azatetramethylene, azapentamethylene, azahexamethylene, thiatetramethylene and thiapentamethylene, X is a member of the group consisting of hydrogen, halogen, lower alkyl, lower alkoxy, hydroxy-lower alkyl and lower alkanoyloxy-lower alkyl, and $n$ is an integer from 1 to 2, 2. A compound of the formula

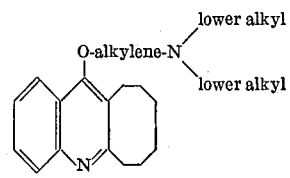

3. A compound of the formula

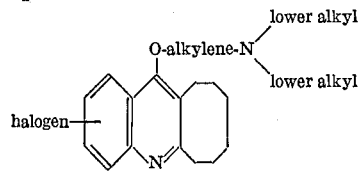

4. 12 - (3 - dimethylaminopropoxy) - 6,7,8,9,10,11-hexahydrocycloocta[b]quinoline.

5. 2 - chloro - 12 - (3 - dimethylaminopropoxy) - 6,7,8,9,10,11-hexahydrocycloocta[b]quinoline.

6. 2 - chloro - 12 - (3 - dimethylaminopropoxy) - 6,7,8,9,10,11-hexahydrocycloocta[b]quinoline oxalate.

References Cited by the Examiner

UNITED STATES PATENTS 3,185,691   5/1965   Pribyl et al. _____ 167—65
3,232,945   2/1966   Sigal et al. _____ 260—288

OTHER REFERENCES

Burger, Medicinal Chemistry, 2nd ed., Interscience, page 551.

ALEX MAZEL, *Primary Examiner.*

DONALD G. DAUS, *Assistant Examiner.*